US009639255B2

(12) United States Patent
Patil et al.

(10) Patent No.: US 9,639,255 B2
(45) Date of Patent: May 2, 2017

(54) USER INTERFACE FOR WIRELESS DEVICE MANAGEMENT

(71) Applicant: Bose Corporation, Framingham, MA (US)

(72) Inventors: Naganagouda B. Patil, Ashland, MA (US); Sanjay Chaudhry, Marlborough, MA (US); Rebecca DeVeer Crimmin, Arlington, MA (US); Joshua James Deane, Wayland, MA (US); Christopher Scott Mucaria, Marlborough, MA (US); Mary-Ellen Prescott, Westford, MA (US); Graeme Reed, Charlestown, MA (US)

(73) Assignee: Bose Corporation, Framingham, MA (US)

( * ) Notice: Subject to any disclaimer, the term of this patent is extended or adjusted under 35 U.S.C. 154(b) by 416 days.

(21) Appl. No.: 14/457,771

(22) Filed: Aug. 12, 2014

(65) Prior Publication Data
US 2016/0048310 A1 Feb. 18, 2016

(51) Int. Cl.
*G06F 3/0482* (2013.01)
*G06F 3/0484* (2013.01)
*G06F 3/0488* (2013.01)
*G06F 3/0486* (2013.01)
*H04M 1/725* (2006.01)

(52) U.S. Cl.
CPC ........ *G06F 3/04847* (2013.01); *G06F 3/0482* (2013.01); *G06F 3/0486* (2013.01); *G06F 3/0488* (2013.01); *G06F 3/04842* (2013.01); *H04M 1/7253* (2013.01); *H04M 1/72544* (2013.01); *H04M 2250/22* (2013.01)

(58) Field of Classification Search
CPC ............... G06F 3/04847; G06F 3/0482; G06F 3/04842; G06F 3/0486
See application file for complete search history.

(56) References Cited

U.S. PATENT DOCUMENTS

2010/0138794 A1 6/2010 Ganey et al.
2013/0260672 A1 10/2013 Patil et al.

FOREIGN PATENT DOCUMENTS

EP 2073514 A2 6/2009

OTHER PUBLICATIONS

International Search Report and Written Opinion dated Nov. 27, 2015 for International application No. PCT/US2015/044775.

*Primary Examiner* — Namitha Pillai

(57) ABSTRACT

A user interface for a communication device having a wireless interface for connection to associated devices includes a graphical display screen integrated into the communication device, a user input device indicating selection and movement of graphical objects displayed on the graphical display screen, and a processor programmed to cause the graphical display screen to display a first arc representing the communication device itself, a first circle surrounding a visual representation of an audio output device associated with the communication device, and a connector between the first arc and the first circle. The connector includes two curved lines each beginning at the first arc and ending at the first circle, the lines curved towards each other between the first arc and the first circle.

20 Claims, 10 Drawing Sheets

USER INTERFACE FOR WIRELESS DEVICE MANAGEMENT

BACKGROUND

This disclosure relates to a user interface for management of wireless devices.

As wireless capabilities are added to more and more devices, providing user interfaces that allow users to configure how such devices are interconnected becomes increasingly difficult. U.S. Patent Publication 2013/0260672, the entire contents of which are hereby incorporated by reference, describes a system by which a wireless device, such as a set of headphones, may relay messages from one connected endpoint device, such as a mobile phone, to another connected endpoint device, such as a tablet computer, such that the two endpoint devices behave as if they have a direct communication link between each other. Such an infrastructure also allows one of those endpoint devices to control not only its own connection to the wireless device, but that wireless device's connection to and interaction with the other endpoint device. Such complex interactions and the details describing them can be very confusing or intimidating for users. This application describes a graphical user interface for operating on such an end point device that intuitively shows the user what is connected, and allows the user to control the wireless device and its interconnections in a comfortable, natural manner.

SUMMARY

In general, in one aspect, a user interface for a communication device having a wireless interface for connection to associated devices includes a graphical display screen integrated into the communication device, a user input device indicating selection and movement of graphical objects displayed on the graphical display screen, and a processor programmed to cause the graphical display screen to display a first arc representing the communication device itself, a first circle surrounding a visual representation of an audio output device associated with the communication device, and a connector between the first arc and the first circle. The connector includes two curved lines each beginning at the first arc and ending at the first circle, the lines curved towards each other between the first arc and the first circle.

Implementations may include one or more of the following, in any combination. A distance between the two curved lines indicates a state of a wireless connection between the communication device and the audio output device. The processor may have an input indicating the signal strength of the wireless connection, and the processor may be programmed to cause the graphical display to display the two curved lines a predetermined distance apart when the signal strength may be above a threshold, and to display the lines closer together when the signal strength may be below the threshold.

The processor may be programmed to cause the graphical display to display the two curved lines a predetermined distance apart when not receiving user input, animate motion of the two curved lines towards each other when the user input indicates dragging of the first circle away from the first arc, and cease displaying the connector when the user input indicates dragging of the first circle away from the first arc by a predetermined amount, and the processor may be further programmed to deactivate the wireless connection between the communications device and the audio output device after the graphical display ceased displaying the connector in response to the user dragging of the first circle away from the first arc by the predetermined amount. The processor may be programmed to deactivate the wireless connection only upon receiving an indication that the user released the first circle after the graphical display ceased displaying the connector. The processor may be programmed to deactivate the wireless connection upon receiving an indication that the user continued to hold the first circle away from the first arc by the predetermined amount for a predetermined amount of time after the graphical display ceased displaying the connector. The processor may be programmed to further cause the graphical display to replace the connector with a pair of generally triangular points extending respectively from the first arc and the first circle, and pointing towards each other, at the positions on the first arc and the first circle where the connector was previously displayed.

The processor may be configured to receive information from the audio output device about other devices associated with the audio output device, and in response to a user input indicating a desire to connect another device to the audio output device, the processor may be programmed to cause the graphical display to display an animation indicating that the audio output device may be in a pairing mode, and upon receiving an identification from the audio device of a second device that has paired with the audio device, the processor may be programmed to cause the graphical display to display a second circle surrounding a visual representation of the second device, and a second connector connecting the second circle to the first circle. The processor may be configured to receive information from the audio output device about other devices associated with the audio output device, and while the audio output device is not actively connected to any of the other devices, the processor may be programmed to cause the graphical display to display additional circles surrounding visual representations of each of the other devices, and in response to an indication that the user dragged a selected one of the additional circles onto the first circle, the processor may be programmed to instruct the audio output device to establish a wireless connection to the device indicated by the selected circle. The processor may additionally be programmed to, after receiving confirmation that the audio output device established the wireless connection to the device indicated by the selected circle, cause the graphical display to continue displaying a second circle surrounding the visual representation of the connected device, cease displaying the other additional circles, and display a second connector between the first circle and the second circle.

The processor may be configured to receive information from the audio output device about other devices associated with the audio output device, and when the audio output device is actively connected to a second device, the processor may be programmed to cause the graphical display to display a second circle surrounding the visual representation of the connected device and a second connector between the first circle and the second circle. Upon receiving an indication that the second device is providing audio signals to the audio output device, the processor may be programmed to cause the graphical display to enlarge the second circle, and display in the second circle at least one of information about the audio signals or a control interface for controlling the second device. The processor may be further programmed to cause the graphical display to display additional circles or partial circles surrounding visual representations of other audio output devices with which the communication device may be associated. The processor may be further programmed to cause the graphical display to animate slight motion of the first circle around the display screen when no user input may be actively being received, the connector stretching and contracting as the circle moves by changing the curvature of the two curved lines. The user input device may include a touch sensor associated with the graphical display screen.

Advantages include providing a user with an intuitive understanding of and control over their interconnected devices.

All examples and features mentioned above can be combined in any technically possible way. Other features and advantages will be apparent from the description and the claims.

DESCRIPTION

Figure 1:
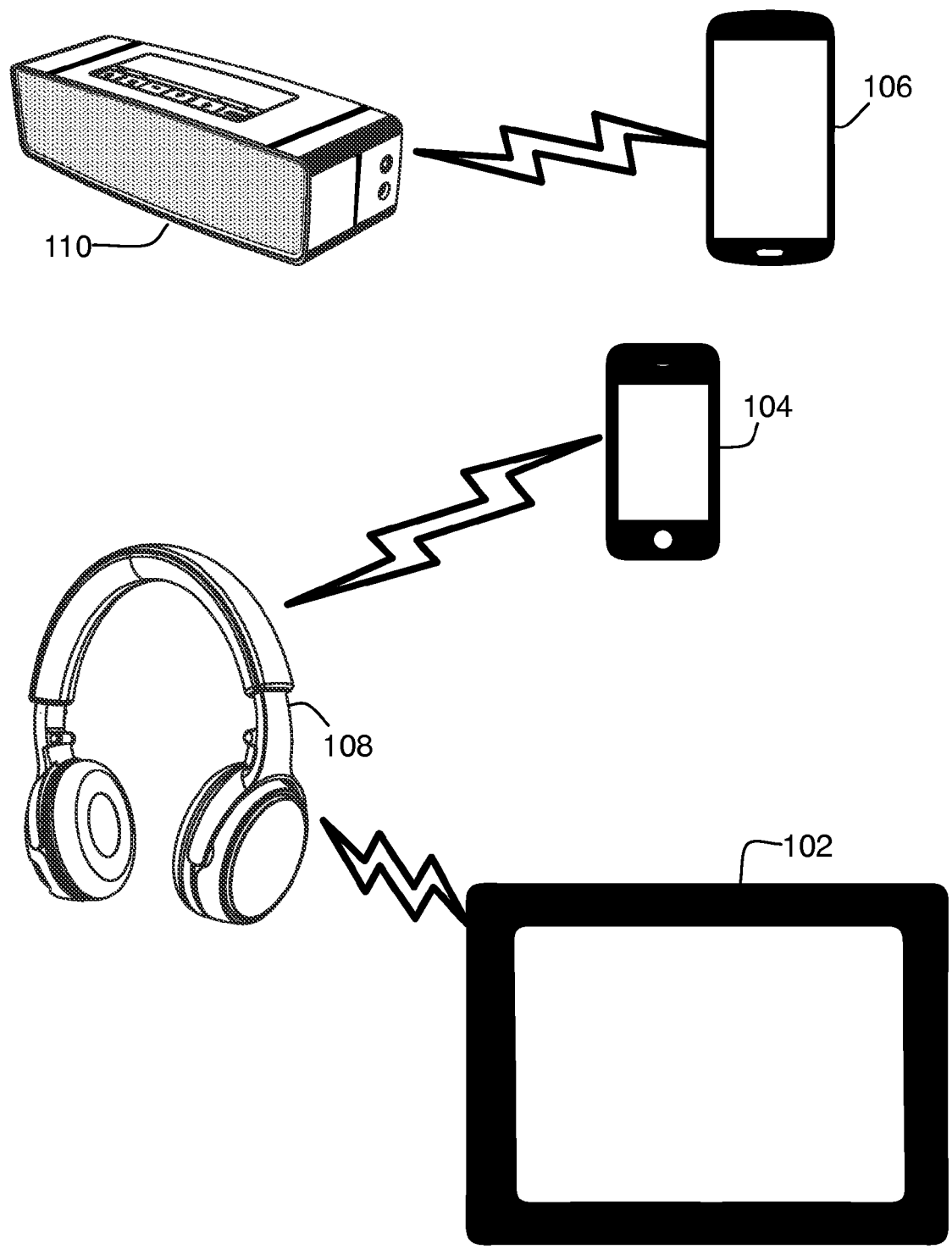
FIG. 1 shows a system of interconnected electronic devices.
Figure 2:
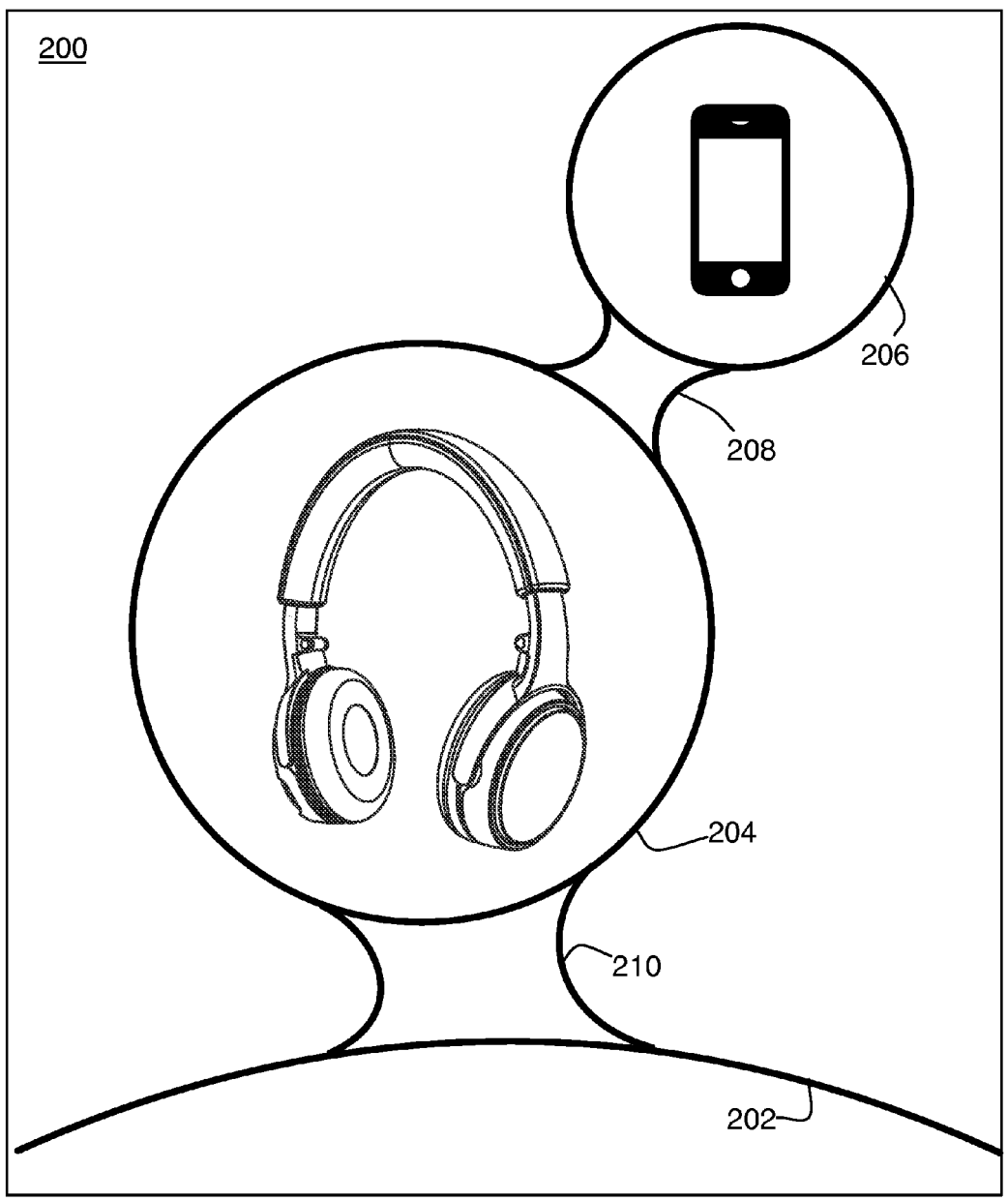
FIGS. 2 through 9 show screens of a user interface for one or more of the devices of FIG. 1.

FIG. 1 shows a representative collection of devices and the wireless connections between them. FIGS. 2 though 9 show various screens of the user interface which show to the user the collection of devices and interconnections depicted in FIG. 1 in various states of operation. In FIG. 1, a first endpoint device 102 is a tablet computer. A second endpoint device 104 is a mobile phone. A third endpoint device 106 is another mobile phone. A first wireless device 108 is a set of headphones. A second wireless device 110 is a portable speaker. In an initial state shown in FIG. 1, the tablet and first mobile phone are paired with the headphones, and the second mobile phone is paired with the speaker. The wireless links between devices are commonly made using Bluetooth® wireless technology, but may also be made using WiFi® wireless technology or any other suitable wireless connection. In the examples that follow, the screen of a tablet computer is used, and a set of headphones are shown as examples only; the interface described is not limited to such devices.

In FIG. 2, a screen 200 that would be shown on the tablet computer 102, a partial circle or arc 202 at the bottom of the screen represents the tablet itself. A first full circle 204 represents the headphones 108, and a second full circle 206 represents the mobile phone 104. Tapered connectors 208 and 210 between the circles represent the wireless connections between the headphones and the two endpoint devices. This allows the user to easily observe that the device he's holding, represented by the partial circle that if complete would surround the user himself, is connected to the headphones, which are also connected to the first mobile phone. The connections are shown as a pair of curved lines extending from one arc or circle to the other circle, with the lines curved slightly towards each other. In some examples, the space between the curved lines is filled with a solid color. In some examples, a symbol, icon, or text may be displayed within the connector to indicate the nature of the connection, such as a Bluetooth icon to represent a Bluetooth connect, or a WiFi icon to indicate that the devices are connected over WiFi. In other examples, the color of the fill may indicate the type of connection. Text may also be used within the arc and circles to identify the devices, in place of or in addition to visual representations of the devices.

Figure 3:
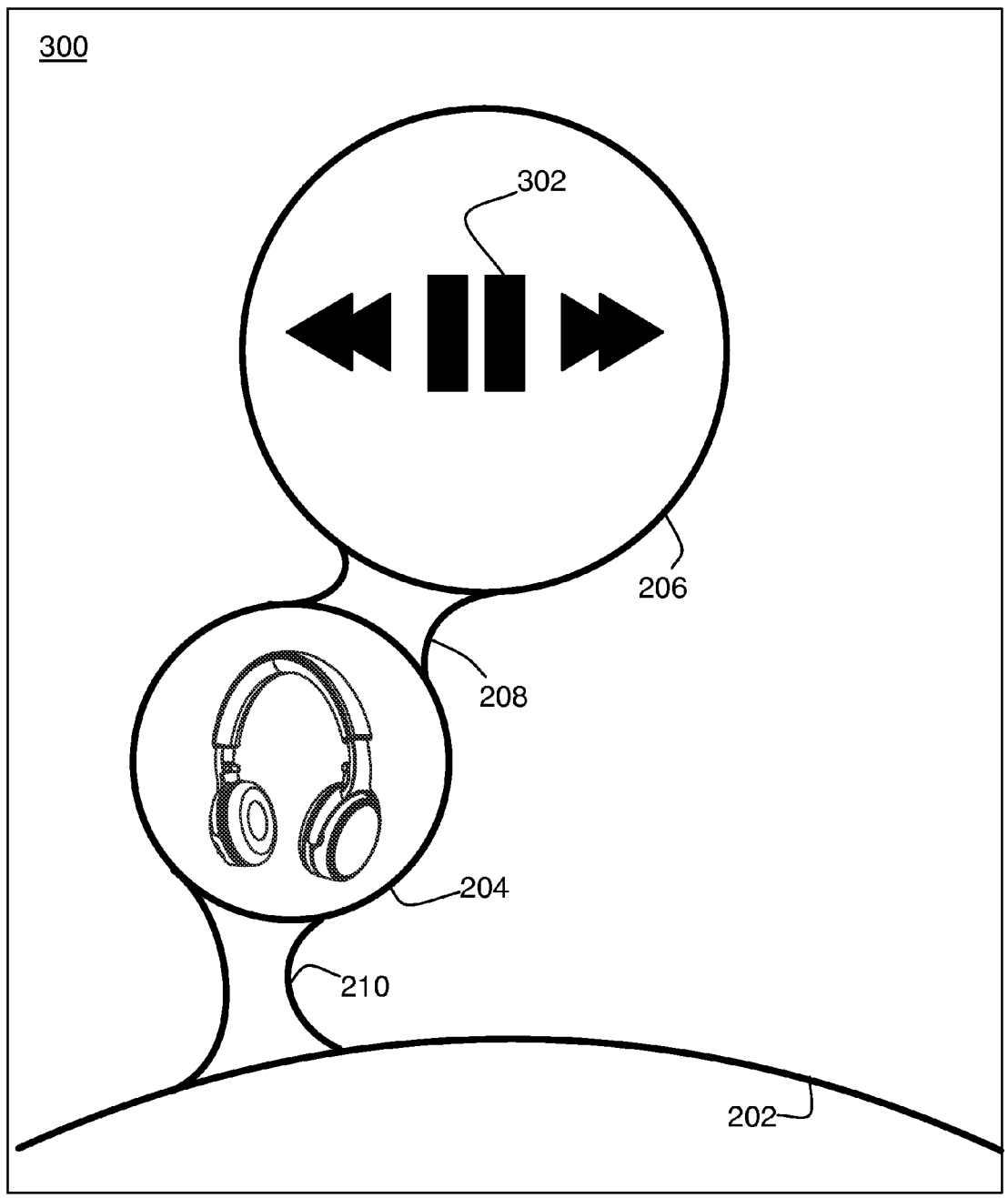

Another aspect of the user interface is shown by screen 300 in FIG. 3. In this screen, the mobile phone represented by circle 206 is providing audio to the headphones. To show this, the circle 204 is decreased in size, and the circle 306 is increased in size. The circle 206 shows transport controls 302 (e.g., pause, last track, next track), and could also show information about the audio, such as a track name, album name, or cover art, to name a few examples. Pressing the controls in the user interface of the device showing the screen 300 results in that device informing the headphones of the action, so that the headphones can relay the command to the remote device which will respond to it.

Figure 4A:
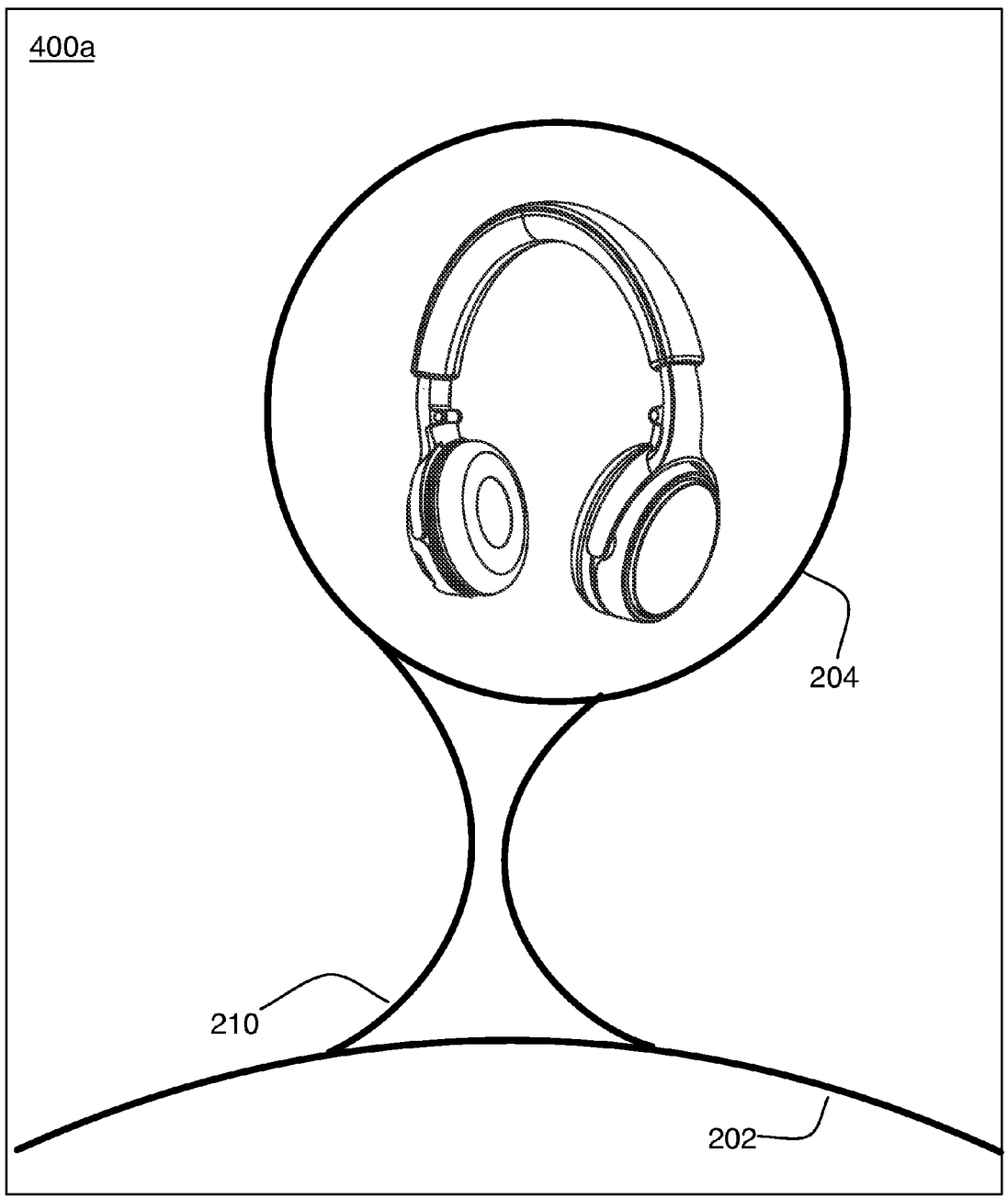
Figure 4B:
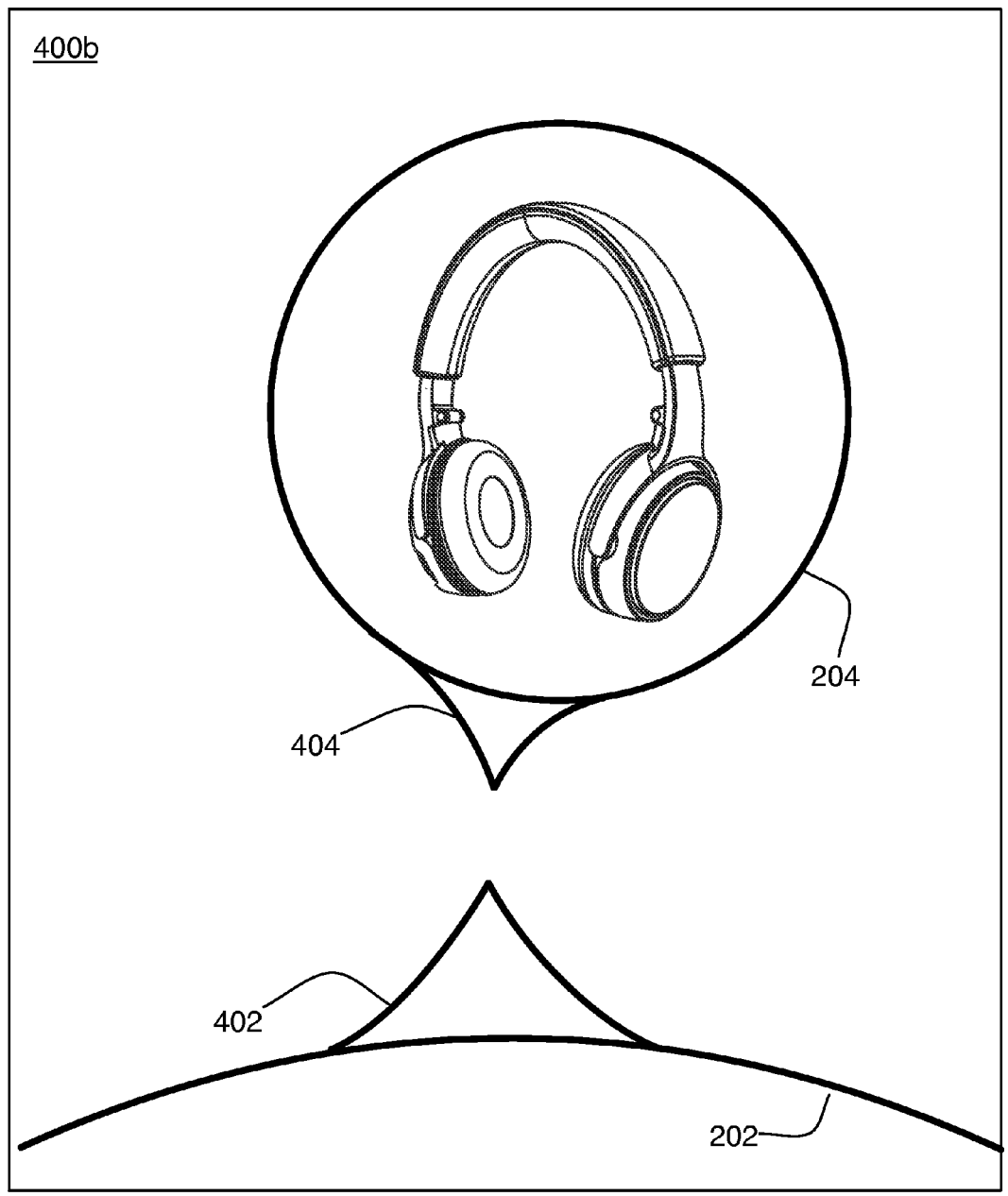

In FIGS. 4A and 4B, a similar screen 400a, 400b shows how the graphical interface responds to user input to show the user what is going to happen in response to the input. Specifically, in screen 400a, a user is dragging the circle 204 representing the headphones away from the arc 202 representing the tablet displaying the interface. This gesture tells the headphones to disconnect from the tablet. As the user drags the circle away from the arc, the connector 210 narrows, as shown in FIG. 4A, until it breaks, as shown by points 402 and 404 in FIG. 4B, indicating intuitively that the user is breaking the connection to the headphones. In actual practice, it may be desired to animate the breaking of the connection before actually breaking it, and only committing to the disconnection after the user releases the circle or holds it away for some predetermined amount of time after the break is shown. If the user brings the circle back to the arc, the animation shows the connection being restored, returning to the screen 400a, and the headphones are not disconnected. Once the user has broken the connection in the user interface, the tablet transmits to the headphones a command to disconnect itself from the tablet. Alternatively, the tablet may simply turn off the connection itself, but that may leave the headphones in an uncertain state. The same interface may be used for disconnecting the remote device represented by circle 206 in FIG. 2 from the headphones, by dragging the circle 206 away from the circle 204 until the connector 208 breaks (not shown).

Figure 5:
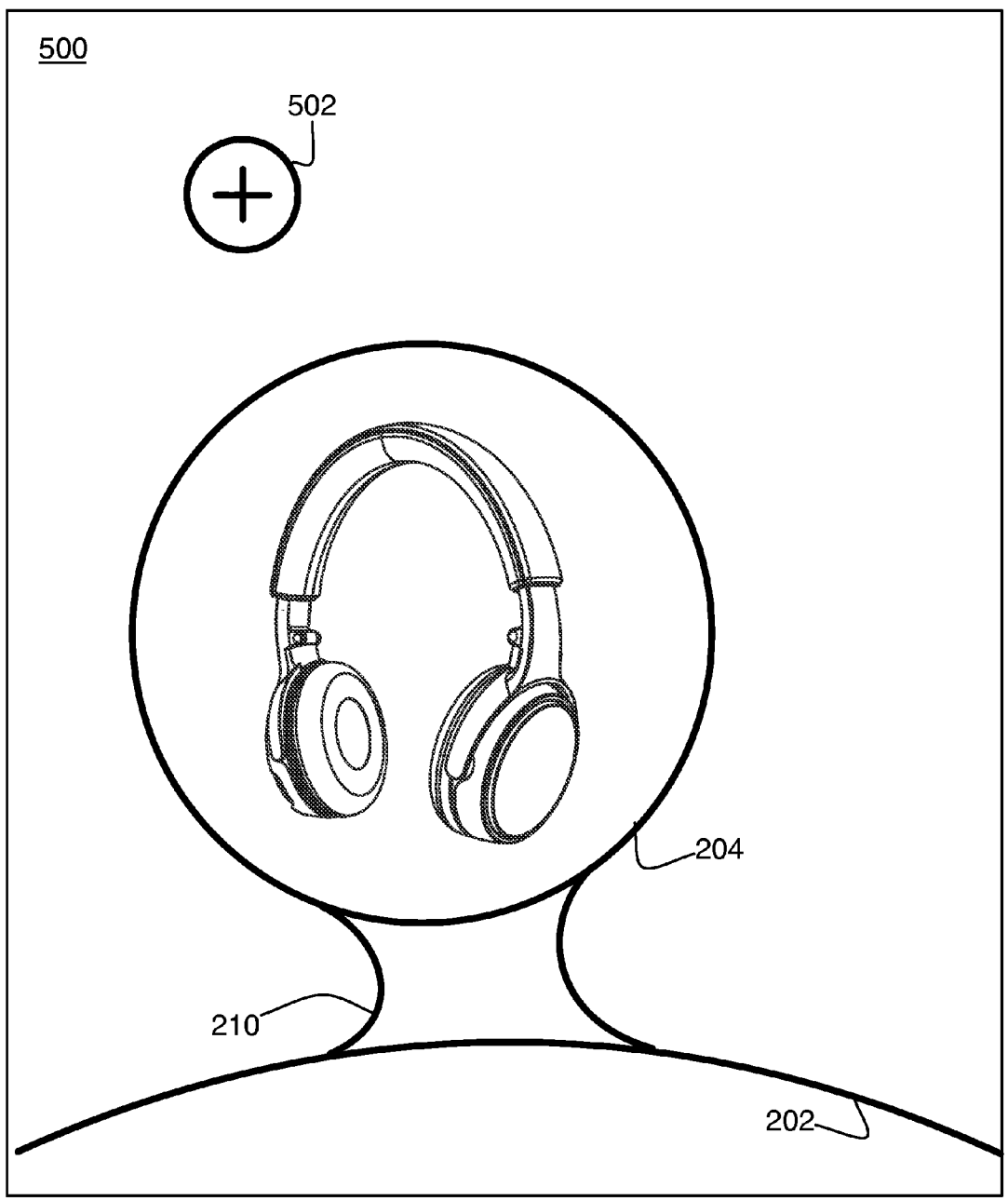
Figure 6:
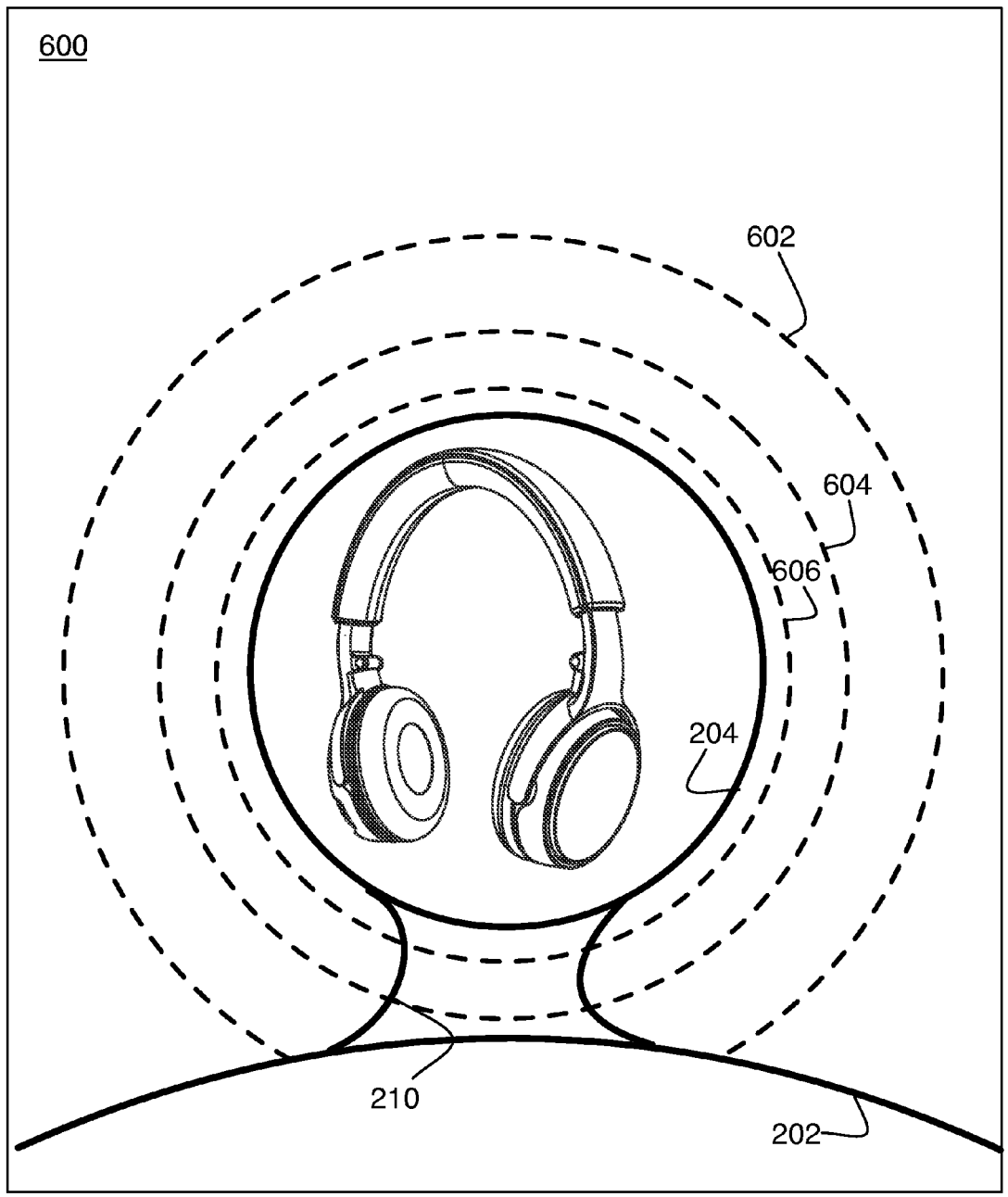
Figure 7:
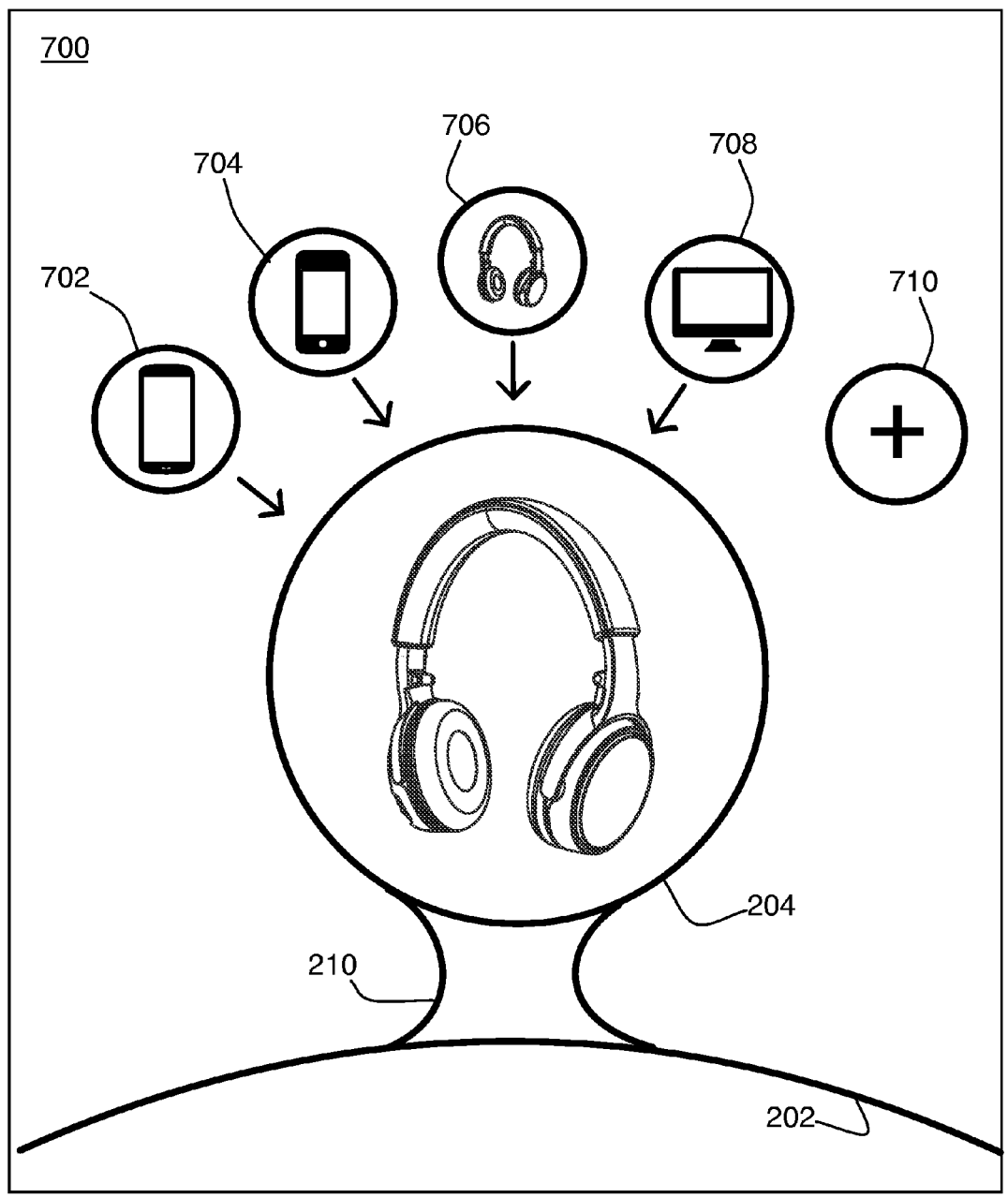

Going the other direction, screens 500 in FIG. 5, 600 in FIG. 6, and 700 in FIG. 7 show the interface for connecting additional devices (such as another one of the mobile phones) to the headphones. In screen 500, a circle 502 with a plus sign is shown near the circle 204 for the headphones. Tapping that circle 502 puts the headphones into a pairing mode. If no other devices are currently paired with the headphones, the interface shows screen 600. In screen 600, circles 602, 604, 606 radiating from the headphones' circle 204 indicate that the headphones are now broadcasting their availability for pairing to other devices that might be in the area. In other examples, a glowing field, rather than radiating circles, may be used. This screen might be used whenever the headphones are in pairing mode, whether initiated through the interface of screen 500 or by the headphones' own user interface.

When other devices are already paired with the headphones, screen 700 in FIG. 7 is used. In screen 700, additional circles 702, 704, 706, 708 representing previously paired devices, which aren't currently connected, are arrayed around the circle 204 representing the headphones. Another circle 710 contains a plus sign, for indicating that the user wishes to pair yet another device. A user may connect the headphones to one of the already-paired devices by simply dragging that device's circle onto the circle representing the headphones. Doing so will return the user to screen 200 in FIG. 2, showing the other connected device as a second circle connected to the headphones' circle. Some intermediate animation may be used to show that the connection is being established.

Note that one of the available devices in screen 700 is not a source device, but is another set of headphones, in circle 706. For some wireless technologies or device architectures, it may be possible for two output devices to be connected to each other, to engage in a variety of peer-to-peer activities, such as direct voice communication or music sharing, or in the case of both devices being out-loud speakers, to provide stereo playback through the two speakers, to name some examples. The same interface used to connect other source devices to the headphones can be used to connect such peer devices. When connected, an additional prompt may be used to ask the user what functions are desired, and the user may be able to control the second output device via a relay through the first output device.

Figure 8:
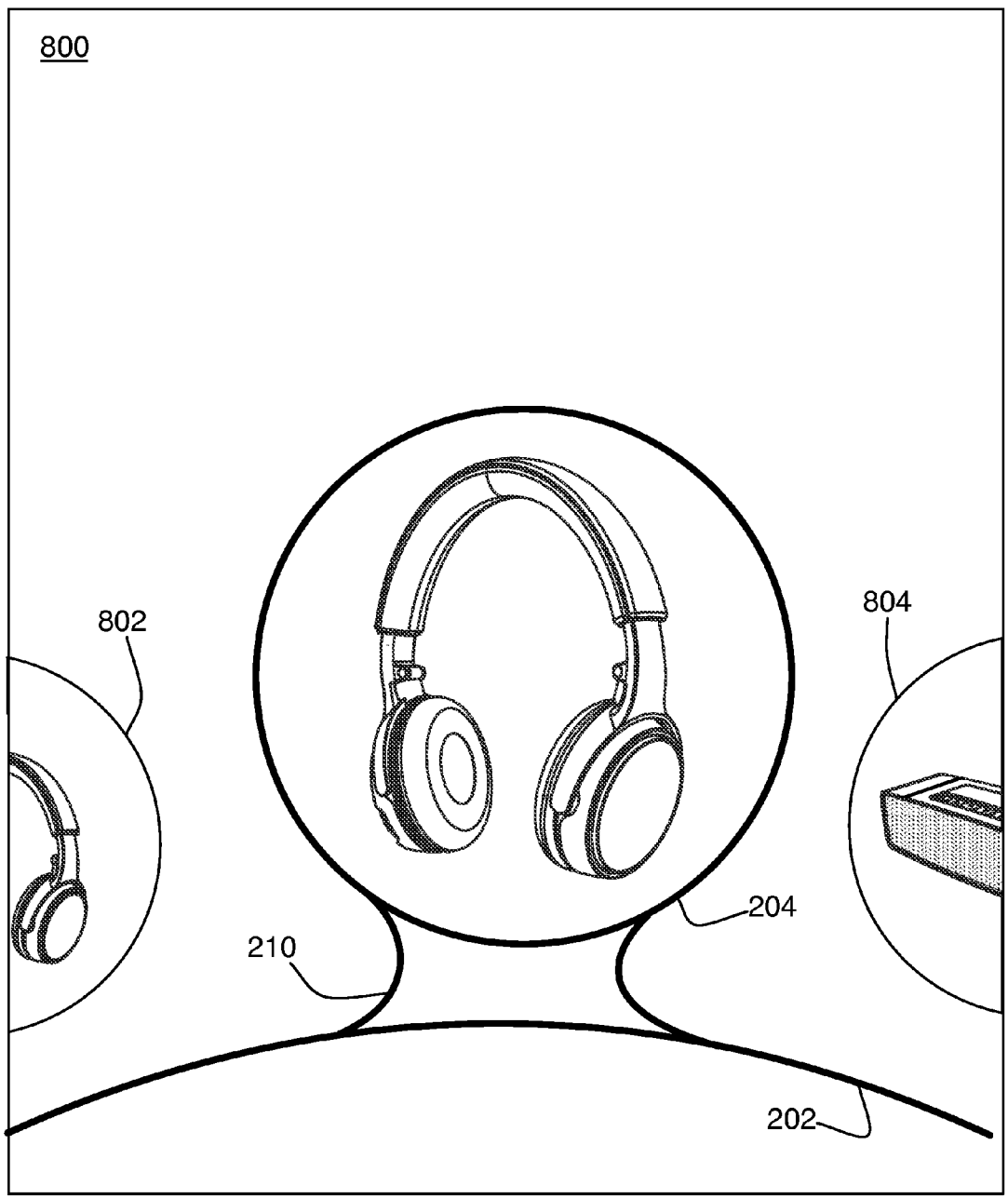

While screen 7 allows a user to connect an additional source device to a single output device, the user may also want to connect a different output device to the device displaying the user interface, whether as an additional output device or in place of the one in use. As shown in screen 800 in FIG. 8, the interface can display other nearby, or previously paired, output devices in additional circles 802, 804, on either side of the circle 204 for the presently controlled device. In some example, tapping one of these other devices may bring up information about it, and dragging it onto the arc 202 representing the device on which the interface is running causes that output device to be connected.

Figure 9:
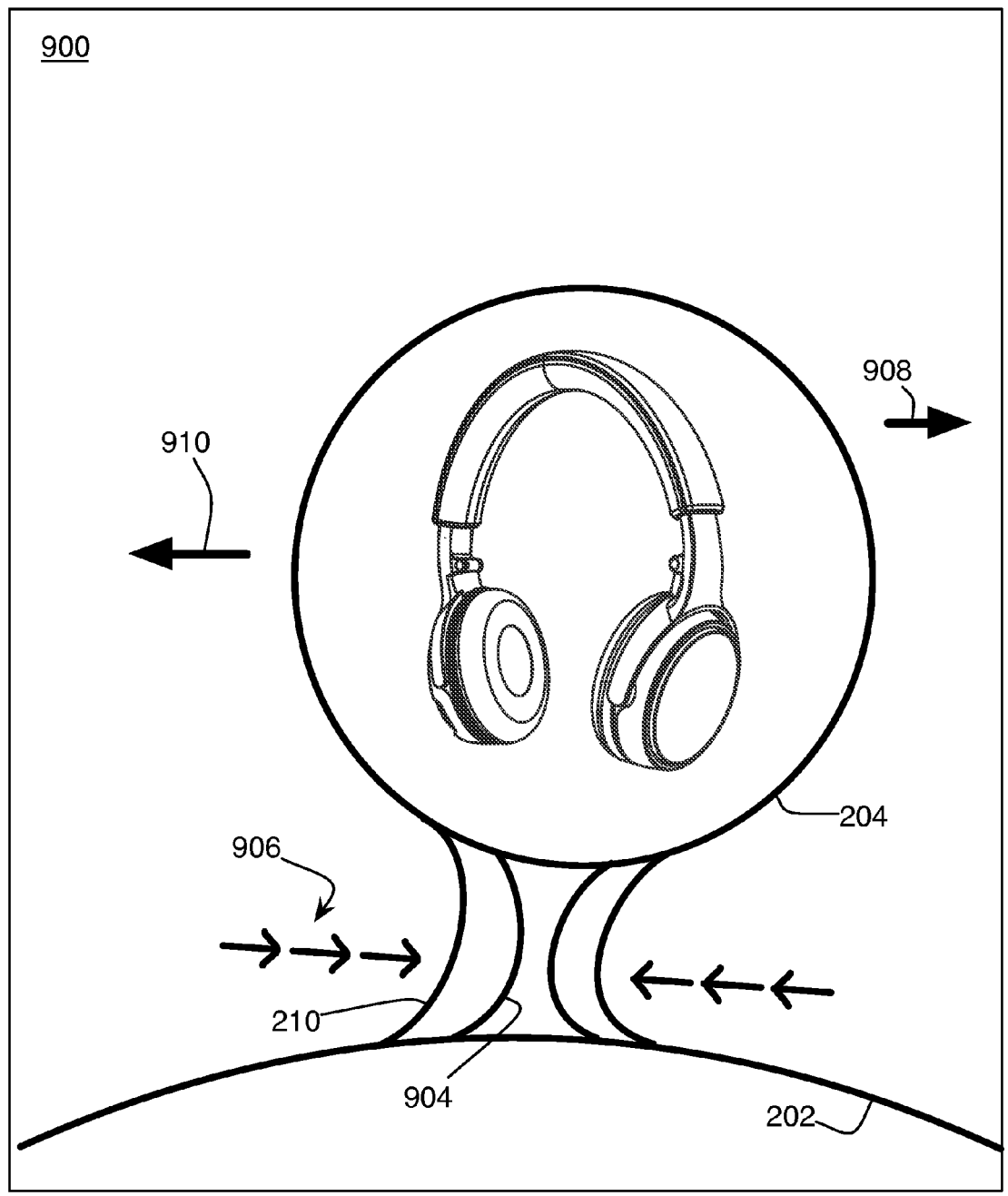

In FIG. 9, a screen 900 shows how the curved connector 210 between connected devices can also indicate the strength of the signal over which the devices are connected. As the signal strength weakens, the neck of the connector narrows, to narrower connection 904, intuitively indicating a weaker connection between the device displaying the screen 900, represented by the arc 202, and the device represented by the circle 204 (i.e., the headphones from FIG. 1). This weakening can be animated, with the connector 210 visibly narrowing or thickening as the connection strength varies, indicated by arrows 906 in this figure, or with animated shadows continuously moving in the direction of the arrows to show a weakened signal.

An additional element shown in FIG. 9, by arrows 908 and 910, is that the circle 204 representing the headphones may drift back and forth on the screen, giving the user an intuitive indication that the connection is live but variable, e.g., that it represents a wireless connection between separate devices. As the circle 204 moves around, the connector 210 stretches and moves accordingly to maintain the link between the arc 202 and the circle 204.

As shown and described in this application, the user interface is displayed on the screen of a computing device, such as a tablet computer. Examples include the iPad® tablet from Apple, Inc., the Surface™ computer from Microsoft Corporation, or one of the many tablets running the Android™ operating system from Google, Inc. The user interface described herein can also be used on other devices, such as smart phones, car audio systems, and laptop or desktop computers. It is generally assumed that the screens used for displaying the user interface are touch-sensitive and the user inputs described above correspond to users touching the screen with their hand or a stylus and information describing such touches being communicated to a processor. In other examples, however, a non-touch screen could be used with a mouse or other pointing device, with similar interactions and effects. The device running the user interface may be referred to as a computing device, or a communication device, without any limitation intended as to the functions of a device using either such description or other descriptions. Generally the device will have a processor used for generating the display, responding to user input, managing the wireless interfaces, and otherwise operating the device. Such functions may be distributed between multiple processors, most commonly a graphics processor and a computing processor. Instructions for such processors may be embedded in the processor, in on-board memory within the device, or loaded as needed from a remote source. In some examples, some of the processing may be done in a remote device, with instructions communicated to the device showing the user interface, for example, in the case of a computer with a wireless display. Any such combination of component devices is within the scope of any claims that are not specifically limited to specific implementations.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, hard disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A user interface for a communication device having a wireless interface for connection to associated devices, the user interface comprising:
a graphical display screen integrated into the communication device;
a user input device indicating selection and movement of graphical objects displayed on the graphical display screen; and
a processor programmed to cause the graphical display screen to display:
a first arc representing the communication device itself;
a first circle surrounding a visual representation of an audio output device associated with the communication device;
a connector between the first arc and the first circle, the connector comprising two curved lines each beginning at the first arc and ending at the first circle, the lines curved towards each other between the first arc and the first circle, wherein the processor is programmed to cause the graphical display to:
display the two curved a predetermined distance apart when not receiving user input, animate motion of the two curved lines towards each other when the user input indicates dragging of the first circle away from the first arc, and cease displaying the connector when the user input indicates dragging of the first circle away from the first arc by a predetermined amount; and the processor is further programmed to:
deactivate a wireless connection between the communications device and the audio output device after the graphical display ceased displaying the connector in response to the user dragging of the first circle away from the first arc by the predetermined amount; and
deactivate the wireless connection upon receiving an indication that the user continued to hold the first circle away from the first arc by the predetermined amount for a predetermined amount of time after the graphical display ceased displaying the connector.

2. The user interface of claim 1, wherein:
a distance between the two curved lines indicates a state of a wireless connection between the communication device and the audio output device.

3. The user interface of claim 2, wherein:
the processor has an input indicating the signal strength of the wireless connection, and
the processor is programmed to cause the graphical display to display the two curved lines a predetermined distance apart when the signal strength is above a threshold, and to display the lines closer together when the signal strength is below the threshold.

4. The user interface of claim 2, wherein the processor is programmed to deactivate the wireless connection only upon receiving an indication that the user released the first circle after the graphical display ceased displaying the connector.

5. The user interface of claim 2, wherein the processor is programmed to further cause the graphical display to replace the connector with a pair of generally triangular points extending respectively from the first arc and the first circle, and pointing towards each other, at the positions on the first arc and the first circle where the connector was previously displayed.

6. The user interface of claim 1, wherein:
the processor is configured to receive information from the audio output device about other devices associated with the audio output device, and
in response to a user input indicating a desire to connect another device to the audio output device, the processor is programmed to cause the graphical display to display an animation indicating that the audio output device is in a pairing mode, and
upon receiving an identification from the audio device of a second device that has paired with the audio device, the processor is programmed to cause the graphical display to display a second circle surrounding a visual representation of the second device, and a second connector connecting the second circle to the first circle.

7. The user interface of claim 1, wherein
the processor is configured to receive information from the audio output device about other devices associated with the audio output device, and
while the audio output device is not actively connected to any of the other devices, the processor is programmed to cause the graphical display to display additional circles surrounding visual representations of each of the other devices; and
in response to an indication that the user dragged a selected one of the additional circles onto the first circle, the processor is programmed to instruct the audio output device to establish a wireless connection to the device indicated by the selected circle.

8. The user interface of claim 7, wherein the processor is further programmed to, after receiving confirmation that the audio output device established the wireless connection to the device indicated by the selected circle, cause the graphical display to:
continue displaying a second circle surrounding the visual representation of the connected device,
cease displaying the other additional circles, and
display a second connector between the first circle and the second circle.

9. The user interface of claim 1, wherein
the processor is configured to receive information from the audio output device about other devices associated with the audio output device, and
when the audio output device is actively connected to a second device, the processor is programmed to cause the graphical display to display a second circle surrounding the visual representation of the connected device and a second connector between the first circle and the second circle.

10. The user interface of claim 9, wherein upon receiving an indication that the second device is providing audio signals to the audio output device, the processor is programmed to cause the graphical display to enlarge the second circle, and display in the second circle at least one of information about the audio signals or a control interface for controlling the second device.

11. The user interface of claim 1, wherein the processor is further programmed to cause the graphical display to display additional circles or partial circles surrounding visual representations of other audio output devices with which the communication device is associated.

12. The user interface of claim 1, wherein the processor is further programmed to cause the graphical display to animate slight motion of the first circle around the display screen when no user input is actively being received, the connector stretching and contracting as the circle moves by changing the curvature of the two curved lines.

13. The user interface of claim 1 wherein the user input device comprises a touch sensor associated with the graphical display screen.

14. A computing device comprising:
a wireless interface for connection to associated devices;
a graphical display screen integrated into the computing device;
a user input device for indicating to the computing device selection and movement by a user of graphical objects displayed on the graphical display screen; and
a processor programmed to cause the graphical display screen to display:
a first arc representing the computing device itself;
a first circle surrounding a visual representation of an audio output device associated with the computing device; and
a connector between the first arc and the first circle, the connector comprising two curved lines each beginning at the first arc and ending at the first circle, the lines curved towards each other between the first arc and the first circle, wherein the processor is programmed to cause the graphical display to: display the two curved lines a predetermined distance apart when not receiving user input, animate motion of the two curved lines towards each other when the user input indicates dragging of the first circle away from the first arc, and cease displaying the connector when the user input indicates dragging of the first circle away from the first arc by a predetermined amount; and the processor is further programmed to:
deactivate a wireless connection between the computing device and the audio output device after the graphical display ceased displaying the connector in response to the user dragging of the first circle away from the first arc by the predetermined amount; and
deactivate the wireless connection upon receiving an indication that the user continued to hold the first circle away from the first arc by the predetermined amount for a predetermined amount of time after the graphical display ceased displaying the connector.

15. The computing device of claim 14, wherein the processor is programmed to deactivate the wireless connection only upon receiving an indication that the user released the first circle after the graphical display ceased displaying the connector.

16. The computing device of claim 14, wherein
the processor is configured to receive information from the audio output device about other devices associated with the audio output device, and
while the audio output device is not actively connected to any of the other devices, the processor is programmed to cause the graphical display to display additional circles surrounding visual representations of each of the other devices; and
in response to an indication that the user dragged a selected one of the additional circles onto the first circle, the processor is programmed to instruct the audio output device to establish a wireless connection to the device indicated by the selected circle.

17. The computing device of claim 16, wherein the processor is further programmed to, after receiving confirmation that the audio output device established the wireless connection to the device indicated by the selected circle, cause the graphical display to:
continue displaying a second circle surrounding the visual representation of the connected device,
cease displaying the other additional circles, and
display a second connector between the first circle and the second circle.

18. The computing device of claim 14, wherein
the processor is configured to receive information from the audio output device about other devices associated with the audio output device, and
when the audio output device is actively connected to a second device, the processor is programmed to cause the graphical display to display a second circle surrounding the visual representation of the connected device and a second connector between the first circle and the second circle.

19. The computing device of claim 14, wherein the processor is further programmed to cause the graphical display to animate slight motion of the first circle around the display screen when no user input is actively being received, the connector stretching and contracting as the circle moves by changing the curvature of the two curved lines.

20. The computing device of claim 14, wherein the user input device comprises a touch sensor associated with the graphical display screen.

\* \* \* \* \*